(12) United States Patent
Shmilovich et al.

(10) Patent No.: US 8,618,719 B2
(45) Date of Patent: *Dec. 31, 2013

(54) AUTONOMOUS POWER GENERATION UNIT FOR AUXILIARY SYSTEM ON AN AIRBORNE PLATFORM

(75) Inventors: Arvin Shmilovich, Huntington Beach, CA (US); Michael A. Carralero, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,939

(22) Filed: Jun. 28, 2012

(65) Prior Publication Data
US 2012/0299446 A1   Nov. 29, 2012

Related U.S. Application Data

(63) Continuation of application No. 12/351,538, filed on Jan. 9, 2009, now Pat. No. 8,232,706.

(51) Int. Cl.
*H01L 41/08* (2006.01)
(52) U.S. Cl.
USPC ............................ 310/339; 310/336; 310/319
(58) Field of Classification Search
USPC ................ 310/339, 319, 349, 328, 330, 332; 244/129.3
IPC ....................................................... H01L 41/08
See application file for complete search history.

(56) References Cited

U.S. PATENT DOCUMENTS

| | | | |
|---|---|---|---|
| 7,301,454 B2 * | 11/2007 | Seyfang et al. | 340/539.26 |
| 7,422,179 B2 | 9/2008 | Mouskis | |
| 7,431,241 B2 | 10/2008 | Adelson | |
| 7,667,375 B2 * | 2/2010 | Berkcan et al. | 310/339 |
| 7,681,839 B2 | 3/2010 | Mickley et al. | |
| 7,793,887 B2 | 9/2010 | Adelson | |
| 8,232,706 B2 * | 7/2012 | Shmilovich et al. | 310/339 |
| 2005/0230555 A1 | 10/2005 | Strong | |
| 2006/0060709 A1 | 3/2006 | Thal | |
| 2006/0060710 A1 | 3/2006 | Takas et al. | |
| 2006/0102791 A1 | 5/2006 | Adelson | |
| 2006/0108475 A1 | 5/2006 | Bartov | |
| 2006/0226293 A1 | 10/2006 | Mickley et al. | |
| 2006/0284019 A1 | 12/2006 | Takacs et al. | |
| 2007/0102583 A1 | 5/2007 | Cutler | |
| 2007/0181748 A1 | 8/2007 | Mouskis | |

(Continued)

*Primary Examiner* — Thomas Dougherty
*Assistant Examiner* — Karen B Addison
(74) *Attorney, Agent, or Firm* — Caven & Aghevli LLC

(57) ABSTRACT

A power generation device that provides power to an auxiliary system on an airborne platform, includes a piezoelectric energy harvesting device and an energy storage unit, including a battery and a power conditioner. The device extracts energy generated by turbulent airflow around the platform and stores the energy to meet future power requirements. The piezoelectric energy harvesting device is located on a portion of an inner surface of an outward shell of the platform. The stand-alone power generation device is electrically connected to the auxiliary system. The stand-alone power generation device also includes a router that connects the power generation unit to the platform electrical distribution system. Excess power generated by the device may be delivered to the platform electrical distribution system for use by other platform systems.

20 Claims, 4 Drawing Sheets

(56) References Cited

U.S. PATENT DOCUMENTS

| | | |
|---|---|---|
| 2008/0210808 A1 | 9/2008 | Adelson |
| 2008/0315722 A1 | 12/2008 | Clingman et al. |
| 2009/0039201 A1 | 2/2009 | Adelson |
| 2009/0224633 A1 | 9/2009 | Clingman et al. |
| 2010/0001124 A1 | 1/2010 | Feldmann |
| 2010/0072320 A1 | 3/2010 | Bartov |
| 2010/0108815 A1 | 5/2010 | Stecko |
| 2010/0270431 A1 | 10/2010 | Mouskis |
| 2011/0001011 A1 | 1/2011 | Degiorgis et al. |
| 2011/0226905 A1 | 9/2011 | Kirkland et al. |

* cited by examiner

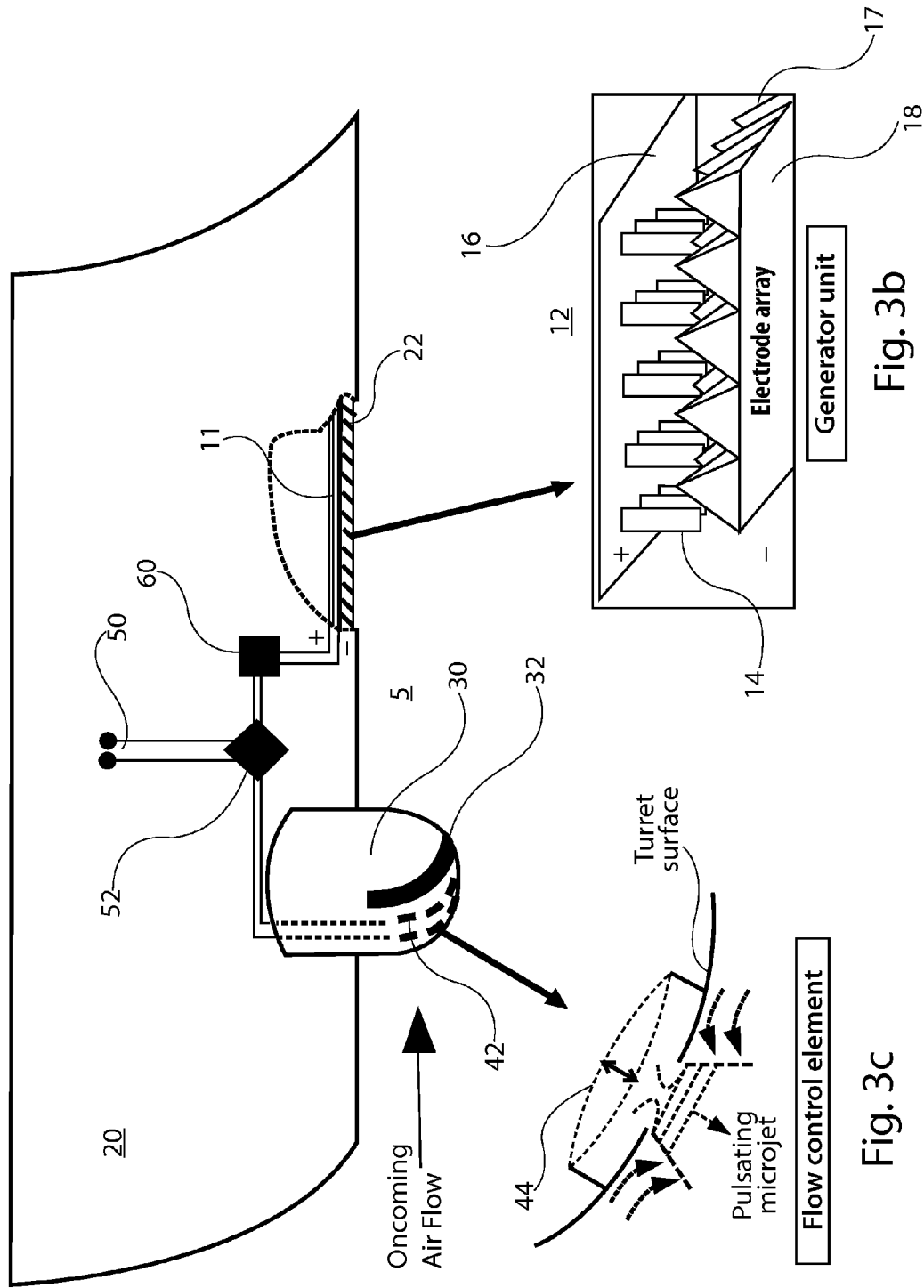

007
AUTONOMOUS POWER GENERATION UNIT FOR AUXILIARY SYSTEM ON AN AIRBORNE PLATFORM

RELATED APPLICATIONS

This application is a continuation of U.S. patent application Ser. No. 12/351,538 to Shmilovich, et al., filed Jan. 9, 2009, now U.S. Pat. No. 8,232,706 entitled AUTONOMOUS POWER GENERATION UNIT FOR AUXILIARY SYSTEM ON AN AIRBORNE PLATFORM, the disclosure of which is incorporated herein by reference in its entirety.

BACKGROUND

The present disclosure is generally related to autonomous power generation for auxiliary systems on an airborne platform. The disclosure has particular utility for use with aircraft automatic flow control devices and will be described in connection with such utility, although other utilities are contemplated.

Current trends point towards ever growing electrical power requirements aboard commercial and military aircraft. The power required for the operation of additional onboard electrical systems give rise to system integration issues which suggest serious implications to airplane weight, volume, maintenance, and safety. For example, the amount of power required by successive packages in commercial applications has increased dramatically over the past few decades. The consumption of power due to technologies that are currently being developed could further accelerate the growing power demand in future packages.

Active Flow Control (AFC) devices are some of many examples of newly developed auxiliary system technologies that require increasing amounts of electrical power. Current AFC designs rely on availability of power supplied by the airplane electrical system, which includes airplane engines, auxiliary power units (APUs), and batteries. The power requirements of AFC devices and other auxiliary systems place an added burden on the already overloaded electrical system.

Ideally new designs will include compact energy efficient auxiliary systems that successfully minimize any additional load on the airplane electrical system. In addition to more efficient flight and lower energy costs, there is a clear environmental benefit which can be realized from reduced energy consumption. The integration of such systems leads to reduced carbon emission and smaller environmental footprint.

Another disadvantage is that current designs require the electrical systems to provide power from a central source to multiple auxiliary ports located on individual airplane components. This requires an extensive wiring network which is inherently inefficient (due to heat losses) and further adds weight to the airplane.

Thus, there remains a need for an auxiliary system design providing autonomous power generation in order to provide power for advanced auxiliary systems while avoiding issues related to weight, volume, maintenance, and safety.

SUMMARY

The present disclosure provides a stand-alone power unit for auxiliary systems on an airborne platform. Instead of using onboard electric power, the system derives energy from the surrounding fluid, which is created by the flight of the platform through the fluid. It extracts energy generated by turbulent airflow and stores it to meet future power requirements. The present disclosure accomplishes this goal without sacrificing aerodynamic efficiency.

One aspect of the present disclosure provides a stand-alone power generation device that provides power to an auxiliary system on an airborne platform, and which includes a piezoelectric energy harvesting device and an energy storage unit. The piezoelectric energy harvesting device preferably but not necessarily is located on a portion of an inner surface of an outward shell of the platform. The stand-alone power generation device is electrically connected to the auxiliary system. The energy storage device includes a battery and may also include a power conditioning device. The stand-alone power generation unit may further comprise a router, which connects the power generation unit to the platform electrical distribution system. Excess power generated by the device may be delivered to the platform electrical distribution system for use by other platform systems.

Another aspect of the present disclosure provides a power generation unit for use on an airborne platform comprising a piezoelectric energy harvesting unit which covers a portion of an inner surface of an outward shell of the platform, and wherein the stand-alone power generation unit is electrically connected to the platform electrical distribution system.

Yet another aspect of the present disclosure provides a method of generating power on an airborne platform. The method involves providing a piezoelectric energy harvesting device on an inner surface of an outward shell of the airborne platform in a location that encounters a turbulent region of flow; conditioning the power output of the piezoelectric energy harvesting device; and delivering the conditioned output to a recipient system, such as an auxiliary system or a power distribution system, for consumption.

Other systems, methods, features, and advantages of the present disclosure are or will become apparent to one with skill in the art upon examination of the following drawings and detailed description. The features, functions and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3C, are detailed illustrations of a stand-alone power generation unit for an auxiliary system on an airborne platform in accordance with the present disclosure.

DETAILED DESCRIPTION

The present disclosure provides a stand-alone power generation device that provides power to an auxiliary system on an airborne platform, generally comprising a piezoelectric energy harvesting device and an energy storage unit. The piezoelectric energy harvesting device is placed on or adjacent a portion of an inner surface of an outward shell of the platform. The stand-alone power generation device is electrically connected to the auxiliary system. The energy storage device includes a battery and a power conditioning device. The stand-alone power generation unit may further comprise a router, which connects the power generation unit to the platform electrical distribution system. Excess power generated by the device may be delivered to the platform electrical distribution system for use by other platform systems.

The system described herein results in a platform having reduced emissions, smaller environmental footprint, and reduced cost of operation. An added advantage of the stand-alone power unit is that it readily can be installed, and therefore can be used to retrofit current airplanes, providing power for various systems, depending on the application. Moreover, excess power generated by the device can be routed to the vehicle power generation/distribution system, further expanding the benefits of the present disclosure.

The energy harvesting concept is discussed primarily within the framework of Active Flow Control (AFC) devices. Use of the stand-alone power generation unit in connection with additional auxiliary systems of various platforms is also contemplated by the present disclosure.

Figure 1D:
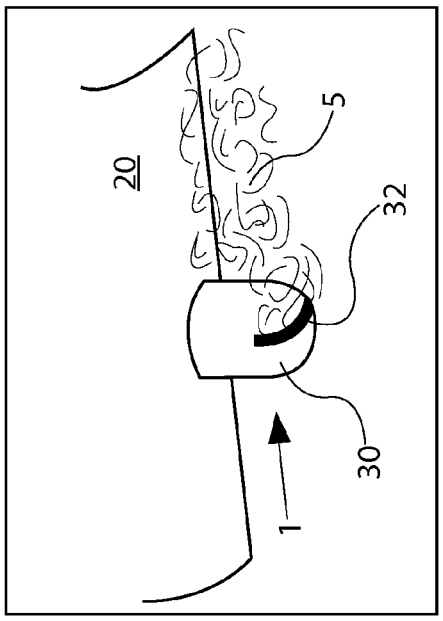
FIGS. 1A-1D are illustrations of a stand-alone power generation unit used in connection with a laser turret having an Active Flow Control (AFC) device, in accordance with the present disclosure.
Figure 1C:
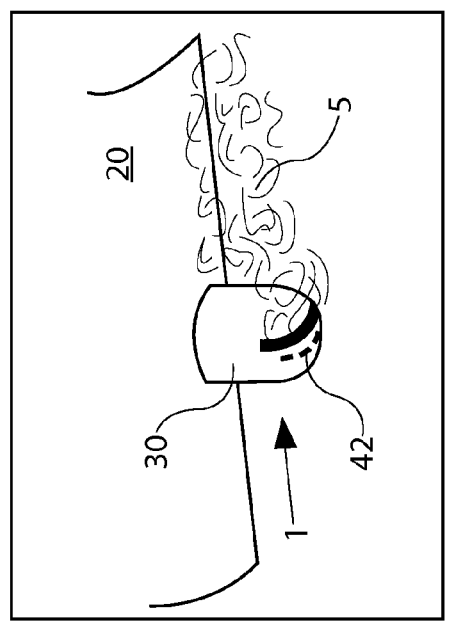
Figure 1A:
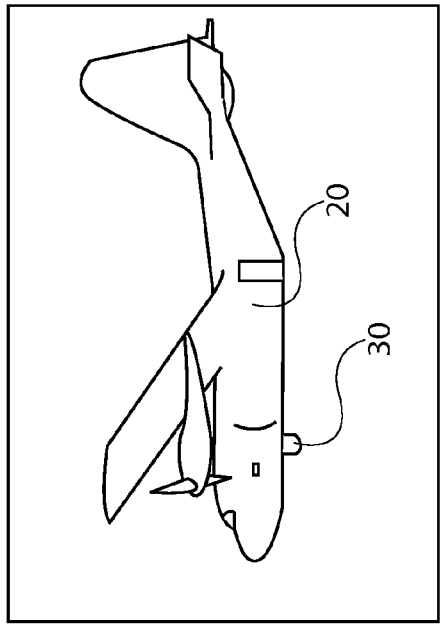
Figure 1B:
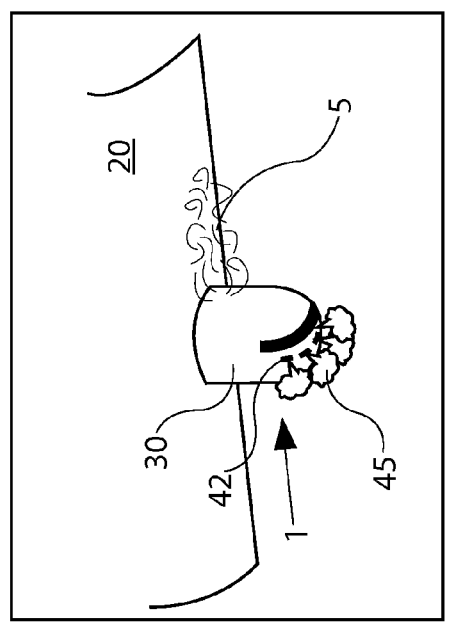

The present disclosure will be described in connection with a stand-alone power unit as used in connection with a high-energy chemical laser system. See FIGS. 1A-1D. This high-energy chemical laser system includes, in part, a laser turret 30, attached to the bottom of a fuselage 20. See FIG. 1D. When activated during flight these devices typically suffer from degradation in performance. This is due to the turbulent flow 5 that forms in the wake of the laser turret 30 as it passes through the oncoming flow 1. Optical beam propagation through turbulent media is hampered, thereby limiting the field of regard. FIGS. 1B and 1C show the flow control ports 42 of an AFC device included as part of the turret. AFC has been demonstrated to improve the flow quality by reducing flow separation downstream of the turret and decreasing the turbulent kinetic energy in the shear layer. The AFC device creates this effect by propagating pulsating microjets 45 out of the flow control ports 42. Note that the turbulent wake has been vastly reduced in FIG. 1C, where the AFC device has been activated. For more information on this phenomenon, see Vukasinovic et al., "Control of a Separating Flow over a Turret," AIAA 2007-4506, incorporated herein by reference.

The stand-alone power generation unit of the present disclosure exploits the incessant turbulent flow that forms around the turret during flight by converting a portion of the turbulent kinetic energy to electrical power. The power may be stored for subsequent operation of the AFC device when the laser is activated. The laser system usually is activated for very short time intervals (seconds), at which time the AFC device is used to reduce the turbulent flow around the turret. If desired, the stand-alone power generation unit may be deactivated during this interval, since the absence of the turbulent flow will make it unlikely that the power generation unit will have a sufficient yield during that period.

The power generation unit of the present disclosure includes a Nano/MicroElectroMechanical System (N/MEMS) energy harvesting device that uses a dual mode operation. During the power generation phase (when the AFC device is not activated) the energy harvesting device uses an array of piezoelectric generator elements to extract energy from the surrounding turbulent flow. When these elements are subjected to vibrational loads from the ensuing turbulent flow or airframe structural motion they produce electrical current or voltage. The generated electrical power is conditioned and then stored on a battery, such as a nano/micro battery. The stored power may then be supplied to operate the AFC module during the distribution phase, when the optical system is turned on. In situations when excess power is generated, the excess power may be routed to the airplane electrical distribution system, wherein the device can serve as a supplemental source of power to other systems on the platform.

Figure 2:
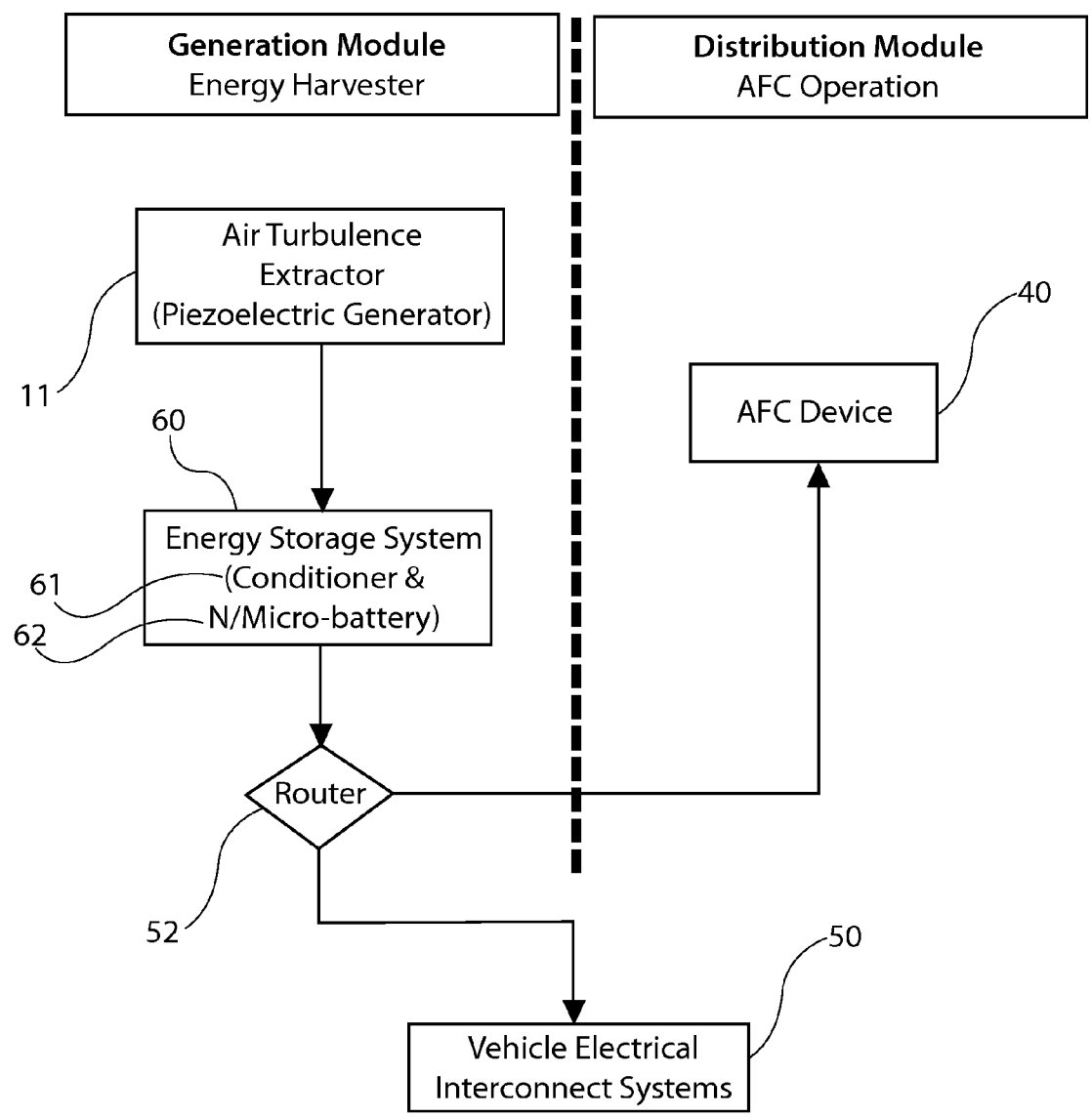
FIG. 2 is a flowchart showing the stand-alone power generation unit for an auxiliary system on an airborne platform in accordance with the present disclosure.

FIG. 2 is a flowchart showing the relationship between the different elements of the stand-alone power generation unit with the AFC device and the electrical systems of the airborne platform. When the power generation unit 10, which may also be called an air turbulence extractor, is exposed to a turbulent flow, it produces an electrical current. This electrical current is then sent to an energy storage system 60, including a conditioner and a battery or microbattery, for storage. When the AFC device 40 is operated, electricity is sent to the AFC device by way of router 52. The router also sends electricity produced in excess of the capacity of the battery to the vehicle interconnect electrical distribution system 50, where it may be utilized by various systems on the airborne platform.

A detailed view of one embodiment of the present disclosure is shown in FIG. 3A. The power generation unit 10 is mounted to the inner side of the airframe skin panel 22 in the leeward region of the turret 30. The unit comprises a plurality of layers of piezoelectric elements 12 made of ZnO (zinc oxide), with a total thickness of 3 mm, forming energy harvesting device 11. The cutaway, FIG. 3B, shows the inner structure of one such element. The cathode is comprised of ZnO nanowires 14 which are attached to an ultrathin flat panel 16. The anode is comprised of electrode 17 and is formed of an array of rigid pyramid shaped elements 18. During flight, the viscous aerodynamic flow exerts continuous, unsteady mechanical strain on the fuselage 20. This dynamic excitation is caused by the constantly fluctuating pressure in the turbulent wake of the laser turret 30 and results in vibration of the electrode 17, located on the inner surface of the fuselage. The relative motion between the electrode and the cathode causes flexing of the nanowires 14. When the piezoelectric nanowires 14 are bent, an electrical charge is generated on the respective stretched side of the individual wires, thereby generating an electric current. An important characteristic of the piezoelectric device is that, when bundled, it results in cumulative electrical power generation.

In order to store and distribute the power generated by the piezoelectric elements 12, the power generation unit 10 further includes an energy storage system 60, including a power conditioner 61 and a battery 62; and a router 52. The power conditioner 61 enhances the signal quality of the power transmitted from the piezoelectric device, such as, for example, noise suppression, transient impulse protection, etc. This power is then delivered to the batteries, such as microbatteries or nanobatteries, for storage. The qualities of the battery chosen may affect the performance of the power generation unit. The batteries preferably are small and have a superior duty profile, delivering a large amount of capacity after many cycles to reduce needs for maintenance. Overall lifetime of the battery is important. Batteries with a short recharging time can provide a significant advantage as well. The batteries should also have the ability to withstand harsh environments, including extreme temperature differentials.

Nanobatteries are known in the art to have advantageous features in each of these areas. For example the duty profile of nanobatteries is much improved relative to Li-Ion batteries, reportedly delivering 99% of capacity after 1,000 charge/discharge cycles. Nanobatteries also typically have efficient nanostructured lattice at the cathode and anode enabling recharges eighty times faster than many batteries. Other batteries that exhibit superior qualities also may be favorable for use with the present disclosure.

The router 52 connects the power generation unit 10 to the vehicle interconnect electrical distribution system 50. Thus, the present disclosure provides a power supply not only for the AFC device, but also provides supplemental electrical power for various systems and processes on the airborne platform. Power will be delivered via the router to the vehicle interconnect electrical distribution system whenever the battery 62 is fully charged.

FIG. 3C shows a detailed view of a flow control port of the AFC device. The AFC device includes a plurality of flow control ports 42 located on the surface of the turret 30. Beneath each of the flow control elements is at least one vibrating membrane 44 that, upon activation, produces a pulsating microjet 45 which may be used to effectively reduce the turbulent wake 5 downstream from the turret 30.

The stand-alone power generation may be used at many locations throughout the platform for various purposes. For example, FIG. 3A shows the power generation unit 10 located within the fuselage 20. In contrast, FIGS. 1B and 1C show the power generation unit 10 located on the downstream side of the turret 30. In any configuration, the power generation unit should be in a location that is exposed to the viscous, turbulent flow caused by the flight of the airborne platform through the fluid.

Figure 4A:
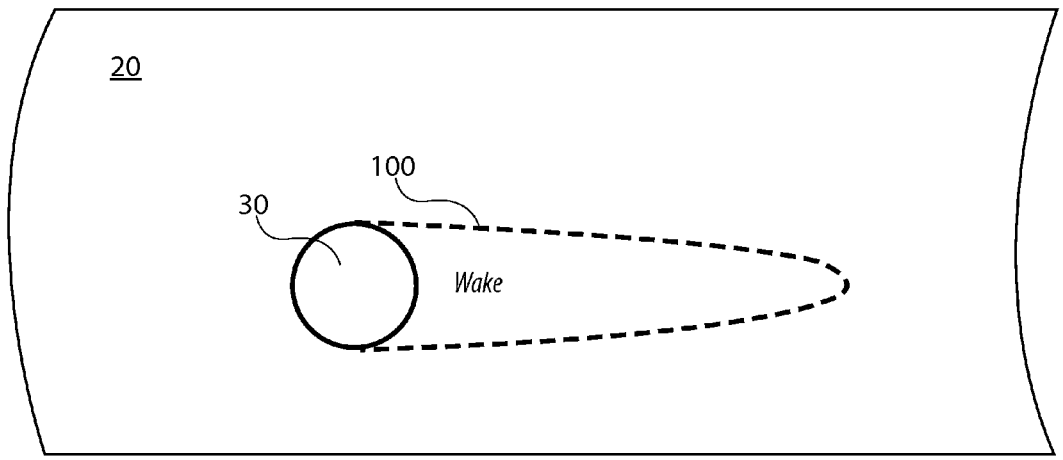
FIGS. 4A and 4B are illustrations of the layout of the stand-alone power generation unit for an auxiliary system on an airborne platform in accordance with one embodiment of the present disclosure.
Figure 4B:
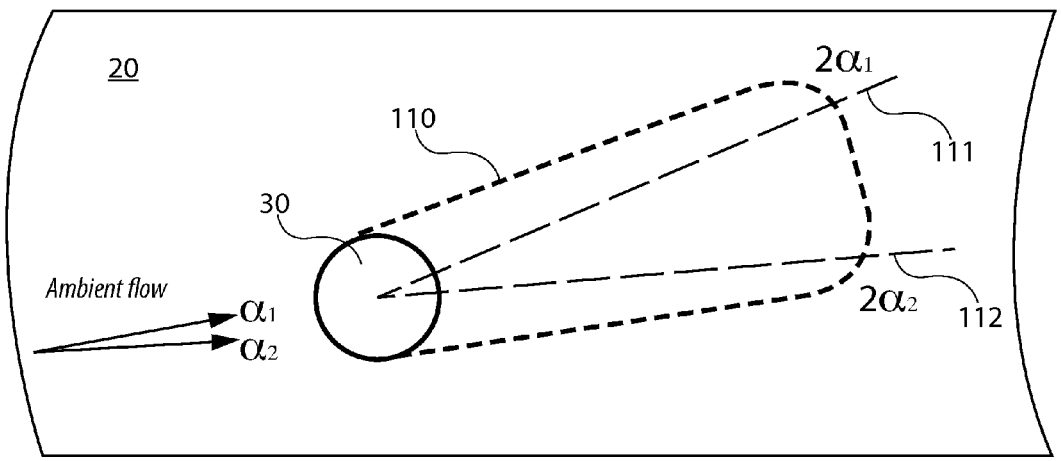

Other alternative installation configurations of the piezoelectric panels on the fuselage are shown in FIGS. 4A and 4B. In these examples, the airplane speed is assumed to be M=0.5 (322 knots) and the frontal area of the turret is assumed to be 0.2 m2.

In FIG. 4A, the piezoelectric energy harvesting device has a shape 100 beneath the surface of the fuselage that roughly takes the shape of a 1:7 semi ellipse (about its minor axis). This closely corresponds to the footprint of the wake off the turret and takes advantage of the region where flow turbulence is intense. The multi-layer piezoelectric device with 10 layers produces 0.5 Volt, 440 Amps and 85 Watts. This represents less than one half of one percent of the kinetic energy contained in the wake of the turret. The actuation needed for the flow control is only 55 Watts.

In the configuration shown in FIG. 4B, the shape 110 of the piezoelectric energy harvesting device is larger in order to exploit situations when the nominal direction of the turret wake changes, depending on flight conditions. For a turret mounted on the side of the fuselage, at start of the mission when the airplane is heavy, the angle of attack $\alpha 1$, is large and the wake is oriented at approximately twice its value (due to the "$2\alpha$" effect), represented by dotted line 111. After a given amount of flight time has passed, the airplane becomes lighter due to fuel burn, at which time the angle of attack $\alpha 2$ is somewhat smaller, with corresponding wake orientation of $2\alpha 2$, represented by dotted line 112. In this layout, the footprint of the wake is contained within the panel throughout the entire mission. Moreover, portions of the panel which are not directly immersed in the wake at a given point in time are still subject to at least some turbulent flow and therefore contribute to power generation, although at a slower rate due to reduced turbulence intensity. In comparison to the configuration shown in FIG. 4A, this panel will produce approximately 110 Watts.

The present disclosure further provides a method for providing power to an auxiliary system on an airborne platform. Referring to FIG. 2, the method includes providing a piezoelectric energy harvesting device 11, which may also be termed as an air turbulence extractor or piezoelectric generator. The output of the piezoelectric energy harvesting device is then conditioned 61 and delivered to a recipient system for consumption. The recipient system may be an auxiliary system, such as AFC device 40, or a power distribution system, such as vehicle electrical interconnect system 50.

The method further incorporates the use of a battery 62 as an intermediate storage device. The conditioned output is delivered to the battery until demanded by the auxiliary system. When the battery has reached its capacity, excess power may be delivered to the power distribution system.

The present disclosure discusses the stand-alone power generation unit for use in connection with an Active Flow Control (AFC) device for use with a high-energy chemical laser system having a turret attached to the fuselage of an aircraft. Other embodiments are also contemplated by the present disclosure. For example, there may be many auxiliary systems on an aircraft that may benefit from the stand-alone power generation unit of the present disclosure. Any such system located near a region of highly turbulent activity would be a good candidate, as the proximity to the turbulent region will minimize the amount of wiring required. The amount of power required for the auxiliary system and the amount of power available to the power generation unit may also need to be considered.

Alternatively, the stand-alone power generation unit may be placed on the aircraft in a turbulent region, even when there is no auxiliary system located near by. The purpose of the stand-alone unit in this instance would be to provide supplemental power to the vehicle interconnect electrical distribution system.

It should be emphasized that the above-described embodiments of the present disclosure, particularly, any "preferred" embodiments, are merely possible examples of implementations, merely set forth for a clear understanding of the principles of the present disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. A power generation device, comprising:
a piezoelectric energy harvesting device; and
a battery coupled to the piezoelectric energy harvesting device by one or more wires;
wherein the piezoelectric energy harvesting device covers a portion of an inner surface of an outward shell of an airborne platform.

2. The power generation device of claim 1, wherein power generation device is coupled to an active flow control device.

3. The power generation device of claim 1, wherein the portion of the inner surface is in a region of the outward shell of the airborne platform that encounters a turbulent region of airflow.

4. The power generation device of claim 3, wherein the turbulent region of airflow is in a wake of an outward protrusion from the outward shell.

5. The power generation device of claim 4, wherein the portion of the inner surface covered by the piezoelectric harvesting device encompasses the turbulent region under multiple flight conditions.

6. The power generation device of claim 1, further comprising a power conditioner.

7. The power generation device of claim 1, further comprising a router.

8. The power generation device of claim 7, wherein the router connects the power generation unit to a platform electrical distribution system, and wherein power generated by the piezoelectric energy harvesting device in excess of the capacity of the battery is delivered via the router to the platform electrical distribution system.

9. The power generation device of claim 1, wherein the piezoelectric energy harvesting device further comprises a plurality of layered piezoelectric elements.

10. The power generation device of claim 9, wherein each of the plurality of layered piezoelectric elements further comprises an electrode array, a flat panel, and a plurality of nanowires arranged perpendicular to and sandwiched between the flat panel and the electrode array.

11. The power generation device of claim 10, wherein the electrode array is comprised of a plurality of rigid pyramid shaped elements.

12. A power generation device comprising a piezoelectric energy harvesting unit which covers a portion of an inner surface of an outward shell of an airborne platform, and wherein the power generation unit is electrically connected to a platform electrical distribution system, and wherein the piezoelectric energy harvesting device further comprises a plurality of layered piezoelectric elements.

13. The power generation device of claim 12, wherein the portion of the inner surface is in a region of the outward shell of the platform that encounters a turbulent region of flow.

14. The power generation device of claim 12, wherein the piezoelectric energy harvesting device further comprises a plurality of layered piezoelectric elements.

15. The power generation device of claim 14, wherein each of the plurality of layered piezoelectric elements further comprises an electrode array, a flat panel, and a plurality of nanowires arranged perpendicular to and sandwiched between the flat panel and the electrode array.

16. A method to generate power, comprising:
providing a piezoelectric energy harvesting device on an inner surface of an outward shell of an airborne platform at a location that encounters a turbulent region of flow;
conditioning an output of the piezoelectric energy harvesting device; and
delivering the conditioned output to a recipient system for consumption.

17. The method of claim 16, wherein the recipient system is an auxiliary system in close proximity to the piezoelectric energy harvesting device.

18. The method of claim 16, wherein the recipient system is a power distribution system for the airborne platform.

19. The method of claim 16, wherein the conditioned output is delivered to a battery for storage until demanded by an auxiliary system, and wherein conditioned output generated in excess of the capacity of the battery is delivered to a power distribution system for the airborne platform.

20. The method of claim 16, wherein the piezoelectric energy harvesting device further comprises a plurality of layered piezoelectric elements, and wherein each of the plurality of layered piezoelectric elements further comprises an electrode array, a flat panel, and a plurality of nanowires arranged perpendicular to and sandwiched between the flat panel and the electrode array.

* * * * *